US005079677A

United States Patent [19]

Kumagai

[11] Patent Number: 5,079,677

[45] Date of Patent: Jan. 7, 1992

[54] HEADLAMP UNIT FOR MOTOR VEHICLES

[75] Inventor: Kimio Kumagai, Hadano, Japan

[73] Assignee: Ichikoh Industries, Ltd., Tokyo, Japan

[21] Appl. No.: 397,783

[22] Filed: Aug. 22, 1989

[30] Foreign Application Priority Data

Aug. 23, 1988 [JP] Japan .............................. 63-207459

[51] Int. Cl.[5] .............................................. B60Q 1/00

[52] U.S. Cl. ...................................... 362/61; 362/346; 362/328; 362/348; 362/309; 362/332

[58] Field of Search .................... 362/61, 80, 346, 308, 362/309, 326, 327, 328, 332, 348, 347, 296, 297

[56] References Cited

U.S. PATENT DOCUMENTS 4,208,704 6/1980 Draper ................................ 362/297
4,475,148 10/1984 Tomforde ............................ 362/80
4,481,563 11/1984 Snyder et al. ....................... 362/296
4,530,042 7/1985 Cibie et al. .......................... 362/309
4,608,623 8/1986 Stephano .............................. 362/80
4,680,679 7/1987 Dilouya ................................ 362/61
4,704,661 11/1987 Kosmatka ............................ 362/61
4,779,179 10/1988 Oyama et al. ....................... 362/348
4,841,423 6/1989 Luciani ................................ 362/61
4,885,669 12/1989 Nino ..................................... 362/80
4,916,585 4/1990 Nino ..................................... 362/287
4,972,307 11/1990 Takasuji et al. ..................... 362/61

FOREIGN PATENT DOCUMENTS 63-12101 1/1988 Japan .

*Primary Examiner*—Stephen F. Husar
*Assistant Examiner*—D. M. Cox
*Attorney, Agent, or Firm*—Foley & Lardner

[57] ABSTRACT

In a slant type headlamp unit for motor vehicles, the reflector has an inner reflecting surface a reflecting area taking the form of a part of a paraboloid of revolution and a light-diverging reflecting area which diverges in the horizontal plane, and a reflects in the vertical plane the rays of light incident from a lamp bulb in directions substantially parallel with the optical axis. The center of the filament of the lamp bulb is disposed nearly parallelly with the optical axis of the reflector and as spaced slightly frontwardly from the focus of the paraboloid of revolution. A front lens is disposed as slanted with respect to said optical axis, covering the front opening of said reflector and having provided on the inner surface by a plurality of prism areas which refract the rays of light emitted from said lamp bulb and reflected at said reflector, thereby forming horizontally elongated illumination patterns and slant illumination patterns frontwardly.

11 Claims, 6 Drawing Sheets

HEADLAMP UNIT FOR MOTOR VEHICLES

BACKGROUND OF THE INVENTION a) Field of the Invention:

The present invention relates to a headlamp unit for motor vehicles, and more particularly to a so-called "slant type" headlamp unit of which the front lens is slanted with respect to the optical axis of the reflector.

b) Description of the Related Art:

One of the requirements imposed on the headlamps for motor vehicles is to illuminate over a lane or road without dazzling the driver of a coming car on the opposite lane or in the opposite direction. To meet this requirement, various types of headlamp units have so far been proposed. A typical one of such conventional headlamp units comprises a reflector having an inner reflecting surface like a paraboloid of revolution, a lamp bulb as light source disposed near the focus of the reflector, and a front lens covering the front opening of the reflector and disposed nearly perpendicularly to the optical axis. The headlamp unit of this type is designed so that the rays of light emitted from the light source and incident upon the inner reflecting surface of the reflector is reflected frontwardly as fluxes of light generally parallel to the optical axis and diverged horizontally to the right and left, thereby providing a desired luminous intensity distribution pattern.

These days, the style of car bodies have been streamlined in order to minimize the large air resistance against a running car and also for meeting the aesthetic requirements. In these circumstances, headlamp units of a new type (slant type) have been proposed which are wholly flush with the body line of the car. In the headlamp units of this type, the front lens is inavoidably slanted with respect to the optical axis. If the basic structure of the above-mentioned headlamp units is applied as it is to the slant-type headlamp unit, the opposite ends of the luminous intensity distribution pattern droop somehow, so it is impossible to illuminate a sufficient area of the lane or road surface for the driver to recognize the traffic signs installed by the side of the lane or a person going to cross the lane.

To avoid such slight droop of the opposite ends of the luminous intensity distribution pattern, a headlamp unit has been proposed which has formed at a part of the inner reflecting surface of the reflector which has the shape of a paraboloid of revolution, a light-diverging reflecting area which diverges the rays of light incident from the light source. One example of such proposed headlamp units is disclosed in the Japanese Unexamined Utility Model Publication No. 63-12101 (laid open on Jan. 26, 1988).

FIG. 1 is a schematic diagram of such headlamp unit, and FIG. 2 is a schematic front view of a reflector having the light-diverging reflecting area. As seen in these Figures, the axis X—X indicates the horizontal plane in which the optical axis of the reflector 10 lies, the axis Y—Y indicates the vertical plane in which the optical axis of the reflector 10 lies, and the axis Z—Z indicates the optical axis of the reflector 10. As shown in FIG. 2, the reflector 10 has formed at the center thereof a central opening 11 for fixing a lamp bulb 12 or light source, and it consists of a main reflecting area 20 made of a part of a paraboloid of revolution (the main reflecting areas formed in positions nearly symmetrical with respect to the vertical plane in which the optical axis lies are indicated with reference numerals 20*a* and 20*b*, respectively), and a light-diverging reflecting area 22 located above the horizontal plane in which the optical axis lies and formed in a position surrounding the central opening 11 (the light-diverging reflecting areas formed in positions generally symmetrical with respect to the vertical plane in which the optical axis lies). The lamp bulb 12 is of a type having two filaments: main filament 12*a* and sub filament 12*b*. Usually, the lamp bulb of this type has the center of the main filament 12*a* positioned nearly at the focus F of the paraboloid of revolution and the center of the sub filament 12*b* positioned at a position displaced toward the front lens. Namely, the rays of light emitted from the sub filament 12*b* and reflected at the main reflecting area 20 formed by a part of a paraboloid of revolution are not substantially parallel with the optical axis but as somehow convergent toward the optical axis.

The diverging reflecting area 22 consists of multiple light-diverging reflecting elements formed as directed longitudinally. The horizontal section of each of the light-diverging reflecting elements takes the form of a concave part of a circle while the vertical section takes the form of a parabola having a focus at the point F. Thus, theoretically, the rays of light incident upon the light-diverging reflecting area 22 from the focus of the reflector are diverged in the horizontal plane while being reflected in directions nearly parallel with the optical axis in the vertical plane. Actually, the rays of light emitted from the sub filament 12*b* at a position off the focus F and incident upon the light-diverging reflecting area 22 are diverged in the horizontal plane and travel as somehow converged toward the optical axis in the vertical plane.

A front lens 13 disposed covering the front opening of the reflector 10 is shown as enlarged in scale in the schematic front view in FIG. 3. There is shown in FIG. 4 a illumination pattern formed with the rays of light emitted from the sub filament 12*b*, refracted through the front lens 13 and projected onto a screen located 10 meters before the headlamp unit. The front lens 13 is disposed as slanted with respect to the horizontal plane in which the optical axis Z—Z lies while the center O thereof is kept coincident with the optical axis. As shown in FIG. 3, the disposition of the front lens 13 is defined by the axis x—x passing by the center O of the front lens 12 and perpendicular to the optical axis and the axis y—y passing by the center O and slanted with respect to the optical axis. The front lens 13 consists of a plurality of prism areas A, B, C, D, E, F, G and H made of multiple cylindrical prism elements (not shown), respectively. The bottom line of each of prism elements forming the prism areas A, B, C, D, F, G and H is parallel with the axis y—y, while only the bottom line (indicated with one dot dash line) of the prism element forming the prism area E is slanted an angle $\theta$ with respect to the axis y—y. As shown, the prism areas A and B are formed as elongated horizontally at the upper left and right portions, respectively, of the front lens 13. The prism area F is formed at the central portion in which the optical axis lies. The prism area C is formed as elongated horizontally below the prism area A, and the trapezoidal prism area E is formed below the prism area C. The prism area D is formed as elongated horizontally below the prism area B, and above and below the axis x—x. These prism areas are contributed to the formation of an illumination pattern by the sub filament 12*b* when energized. The prism areas G and H shown in FIG. 3 are contributed to the formation of an illumination pattern by the main filament when energized, the prism area G providing an illuminated zone at the center of the luminous intensity distribution pattern where the luminance is very high while the prism area H forms a horizontally elongated illuminated zone extending to the right and left from the center of the luminous intensity distribution pattern and in which the luminance is relatively low. However, since these prism ares G and H have nothing to do directly with the subject of the present invention, they will not be further described hereinbelow.

The rays of light reflected at the main reflecting surface areas 20$a$ and 20$b$ formed by a part of a paraboloid of revolution are incident upon any of the prism areas A, B, C, D, E and F, while the rays of light diverged at the light-diverging reflecting areas 22$a$ and 22$b$ are incident upon any of the prism areas D, E and F. The rays of light refracted through these prism areas are projected to form the illumination patterns on a screen as will be described below.

The rays of light reflected at the main reflecting area 20$b$ and then incident upon the prism area A, those reflected at the main reflecting area 20$a$ and incident upon the prism area B, and those reflected at the main reflector areas 20$a$ and 20$b$ and incident upon the prism area F form horizontally elongated illumination patterns (A), (B) and (F), respectively, below the horizontal plane and where the luminance is relatively low. The rays of light reflected at the main reflecting area 20$b$ and then incident upon the prism area C form an illumination pattern (C) extending from the center toward the lower left and in which the luminance is relatively high. The rays of light reflected at the main reflecting area 20$a$ and then incident upon the prism area D form an elongated illumination pattern (D) below the horizontal plane and where the luminance is relatively high. Further, the rays of light reflected at the main reflecting area 20$b$ and then incident upon the prism area E form an illumination pattern (E) extending from the center toward the upper left and in which the luminance is relatively high.

On the other hand, the rays of light diverged at the light-diverging reflecting areas 22$a$ and 22$b$ are incident upon elongated horizontal zones D0, E0 and F0 (indicated as enclosed with dash line in FIG. 3) located above the horizontal plane X—X in the prism areas D, E and F. The rays of light incident upon the horizontal areas DO and FO in the prism areas D and F form horizontally elongated illumination patterns (DO) and (FO) below the horizontal plane and in which the luminance is relatively low. In the prism area E, the bottom line of each of the cylindrical prism elements is slanted an angle $\theta$ with respect to the axis y—y, so the rays of light diverged at the light-diverging reflecting areas 22$a$ and 22$b$ and then incident upon the elongated horizontal area EO in the prism area E are travel in the direction of arrows j-k. Therefore, a horizontally elongated illumination pattern below the horizontal plane, such as formed by the horizontal areas DO and FO, cannot be formed but an illumination pattern (EO) is formed as derived from the shift of a horizontally elongated pattern in the direction of arrow P and in an opposite direction Q to the direction P.

Illumination patterns formed by the prism areas are superposed on one another to form an actual luminous intensity distribution pattern, thereby overcoming the drawback of the conventional technique that the luminous intensity distribution pattern bends with the opposite ends thereof drooping somehow. As having been described in the above, however, since the rays of light diverged at the light-diverging reflecting areas 22$a$ and 22$b$ are further diverged by the prism elements forming the horizontal area EO in a direction perpendicular to a bottom line slanted an angle $\theta$ with respect to the axis y—y, that is, in the direction of arrows j-k, the illumination pattern (EO) projected on the screen protrudes very much above the profiles of the horizontally elongated illumination patterns (A), (B), (D), (D), (DO) and (FO), which is another drawback of the conventional technique. Actually in such luminous intensity distribution pattern, the horizontal cut line is indefinite and low in luminance, and in the pattern projected on the road surface, the luminance of the illumination pattern (EO) is relatively low, but a part of the pattern extends to the opposite traffic lane.

SUMMARY OF THE INVENTION

The present invention has an object to overcome the above-mentioned drawbacks of the conventional techniques by providing a headlamp unit which provides a practical luminous intensity distribution pattern of which the opposite ends do not droop or bend and which does not extend to the opposite traffic lane.

The above-mentioned object is attained by providing a slant type headlamp unit comprising, according to the present invention, a reflector having as its inner reflecting surface a reflecting area taking the form of a part of a paraboloid of revolution, a lamp bulb having at least a coil filament disposed in the proximity of the focus of the paraboloid of revolution and nearly parallel with the optical axis of the reflector, a front lens disposed as slanted with respect to the optical axis, the front lens covering the front opening of the reflector and having a plurality of prism areas which refract the rays of light emitted from the lamp bulb and reflected at the reflector. The reflector having light-diverging reflecting areas formed in positions above the optical axis and nearly symmetrical with respect to a vertical plane in which the optical axis lies, the light-diverging reflecting areas being composed of a plurality of light-diverging reflecting elements which diverge in the horizontal plane, the rays of light emitted from the lamp bulb and reflect, in the vertical plane, the rays of light in directions substantially parallel to the optical axis; the prism areas of the front lens including first and second prims areas. The first prism area forming horizontally elongated illumination patterns frontwardly and at least one portion of them being located along a horizontal line passing by the intersection with the optical axis, the portion having substantially the same horizontally diverging property as the light-diverging reflecting areas of the reflector. The second prism areas forming slanted illumination patterns in a frontward direction and being located substantially adjacent one of the portion of the first prism areas, thereby the illumination patterns are superposed to produce a luminous intensity distribution pattern having a cut-off line and not extending to the opposite line of traffic of the motor vehicle. prism areas which form the horizontally elongated illumination patterns.

BRIEF DESCRIPTION OF THE DRAWINGS

FIGS. 5 thru 7 show an embodiment in which the slant type headlamp unit according to the present invention is applied to a slant type headlamp unit of which the reflector can be tilted with respect to the lamp housing thereof, in which FIG. 5 is an axial sectional view for the brief explanation of the general structure of the slant type headlamp unit;

FIG. 6 is a front view, enlarged in scale, of the front lens shown in FIG. 5; and FIG. 7 is a schematic drawing for explanation of the luminous intensity distribution pattern provided by the slant type headlamp unit according to the present invention;

DETAILED DESCRIPTION OF THE PREFERRED EMBODIMENTS

Figure 1:
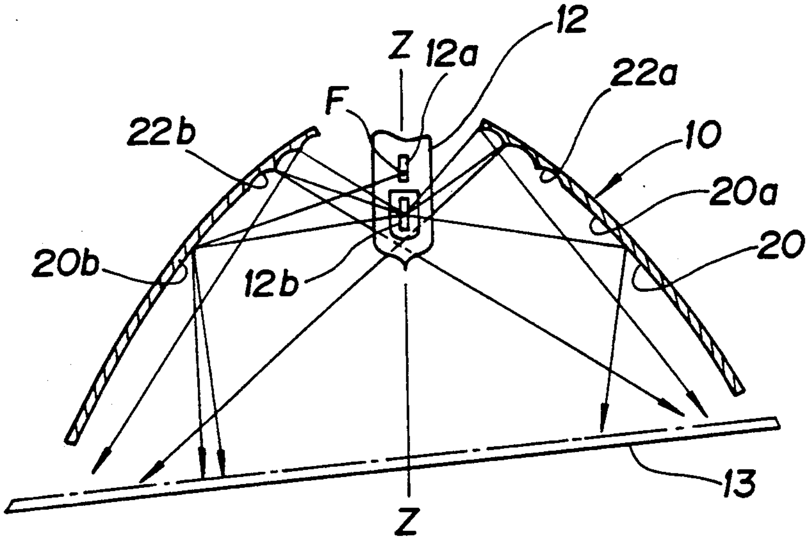
Fig. 1 (PRIOR ART)
FIG. 1 is a schematic drawing for the explanation of the optical system of a conventional slant type headlamp unit, the reflector being shown in a horizontal sectional view.

One embodiment of the slant type headlamp unit according to the present invention will be described in detail with reference to the accompanying drawings. Through the figures, the elements indicated with the same reference numerals as in FIGS. 1 thru 4 are the same or similar elements as or to those in FIGS. 1 to 4.

Figure 2:
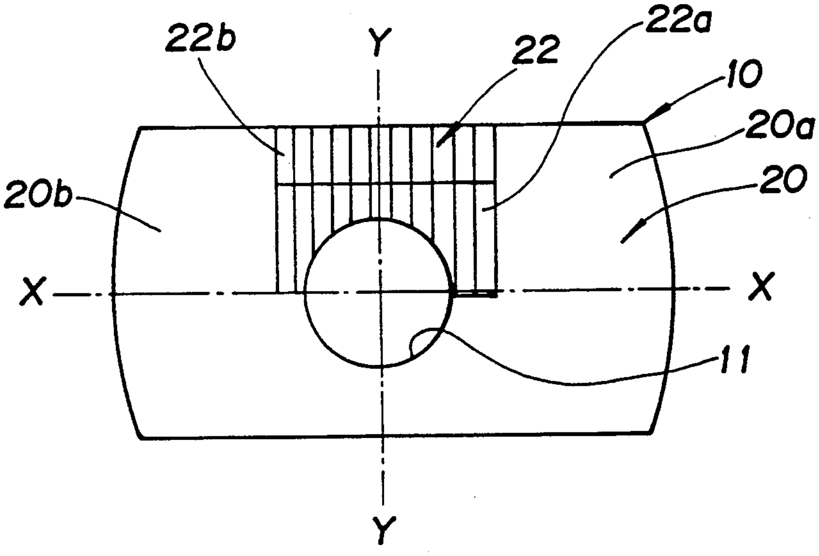
Fig. 2 (PRIOR ART)
FIG. 2 is a schematic front view of the reflector shown in FIG. 1.
Figure 3:
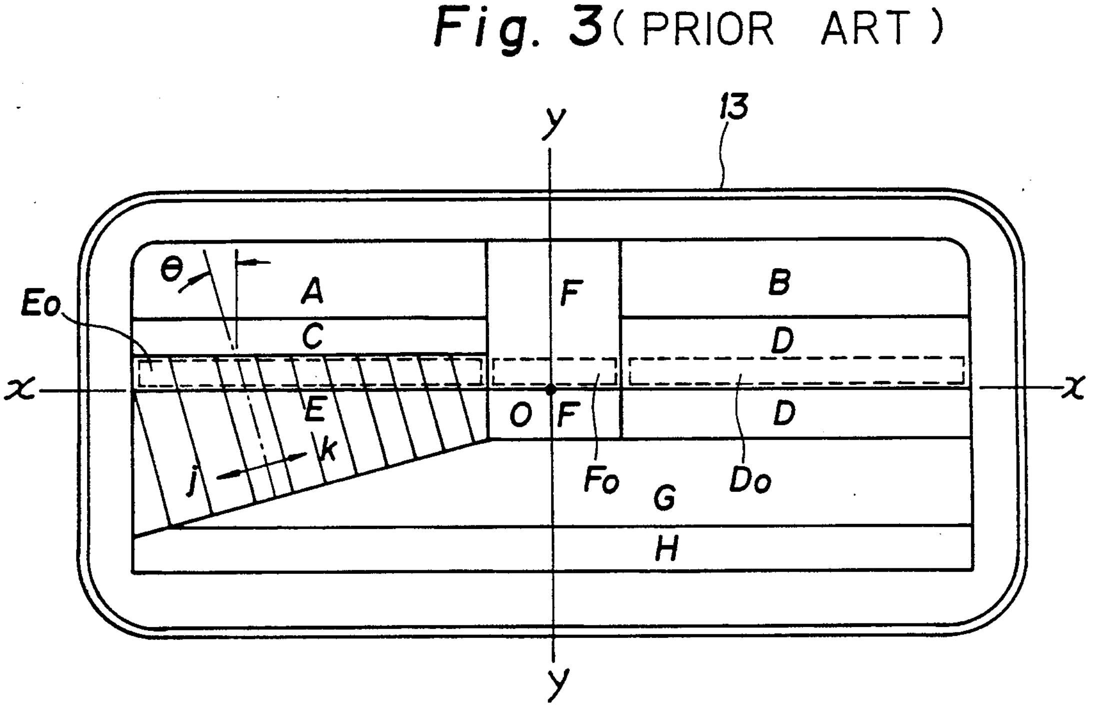
Fig. 3 (PRIOR ART)
FIG. 3 is a front view showing the front lens in FIG. 1 enlarged in scale.
Figure 4:
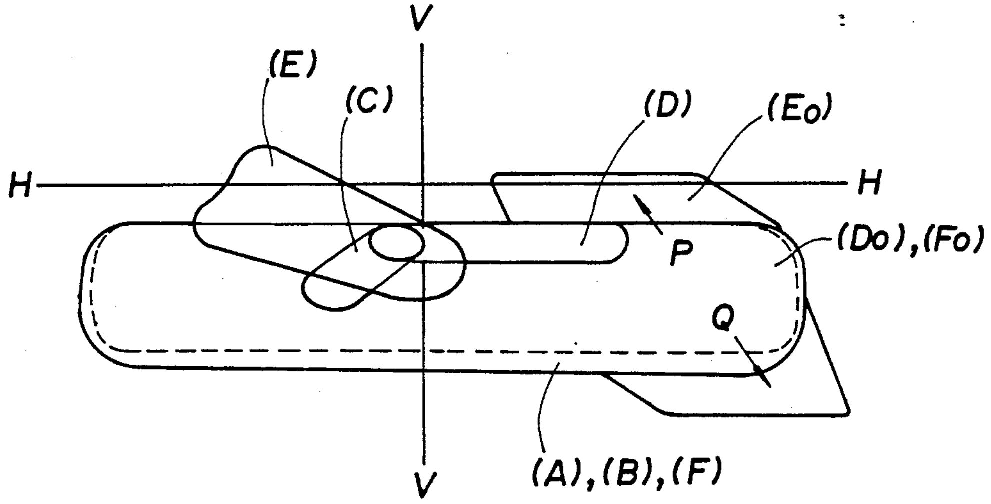
Fig. 4 (PRIOR ART)
FIG. 4 is a schematic drawing for the explanation of the luminous intensity distribution pattern formed by the conventional headlamp unit.
Figure 5:
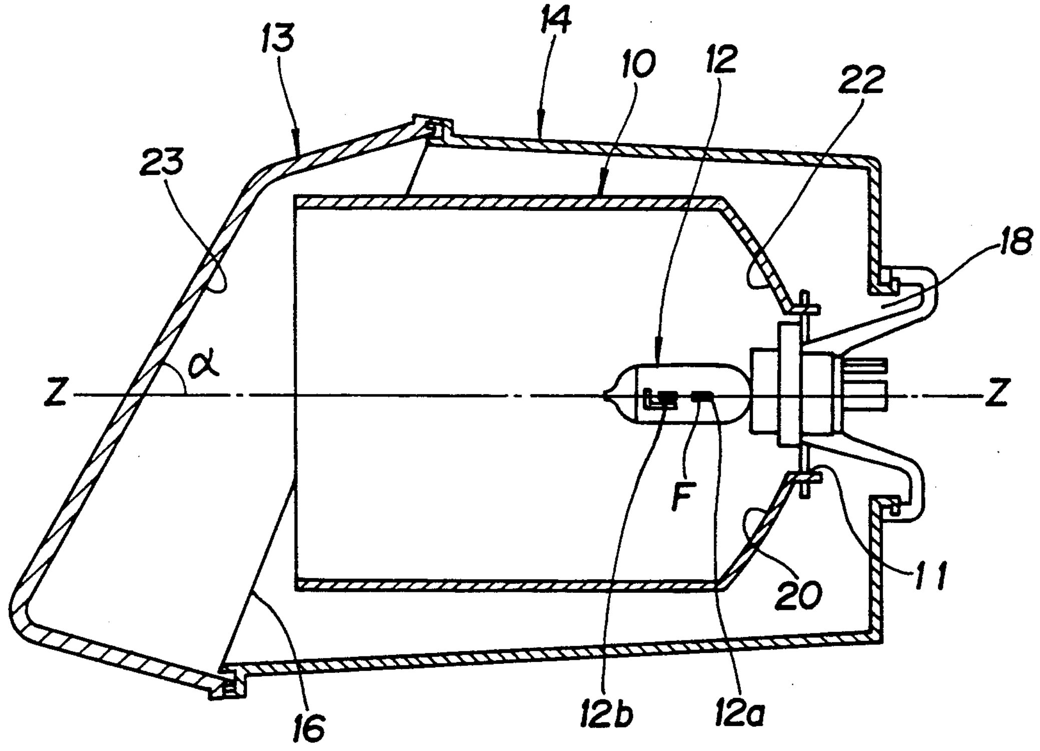

Referring now to FIG. 5 showing the whole structure of the slant type headlamp unit according to the present invention, a reflector 10 and lamp bulb 12 as light source are provided inside a lamp housing 14. The lamp housing 14 has formed at the front and rear thereof an opening 16 and another opening 18. A front lens 13 is secured to the circumferential edge of the front opening 16. The basic structures of the reflector 10 and lamp bulb 12 are nearly the same as those in the conventional headlamp unit shown in FIG. 2, provided that the reflector 10 can have the posture adjusted so as to have the optical axis thereof made coincident with the center of the front lens 13. The reflector 10 is composed of a main reflecting area 20 consisting of a part of a paraboloid of revolution (main reflecting areas formed in positions nearly symmetrical with respect to a vertical plane in which the optical axis lies being indicated with **20*a* and 20*b*, respectively), and a light-diverging reflecting area 22 positioned above a horizontal plane in which the optical axis lies and surrounding a central opening 11 (light-diverging reflecting areas formed in positions symmetrical with respect to the vertical plane in which the optical axis lies being indicated with 22*a* and 22*b*, respectively). The lamp bulb 12 is of such a type as has two filaments: main and sub, 12*a* and 12*b*, respectively. The center of the main filament 12*a* is disposed at a position nearly coincident with the focus F of the paraboloid of revolution, while the center of the sub filament 12*b*** is disposed in a position off the focus F in the direction of the front lens.

The front lens 13 has formed on the inner surface thereof prism areas (shown in FIG. 6) composed of a plurality of cylindrical prism elements 23. The front lens 13 itself is slanted upward with respect to the optical axis Z—Z of the reflector 10. The rays of light emitted from the sub filament **12*b* and reflected at the main reflecting area 20 formed by a part of paraboloid of revolution are not substantially parallel with the optical axis but somehow convergent toward the optical axis. The rays of light diverged at the light-diverging reflecting areas 22*a* and 22*b* are made incident upon near the horizontal line x—x of the front lens 13**.

According to this embodiment, the ones A, B, C, D, F, G and H of the plurality of prism areas on the front lens 13 and the bottom lines of the cylindrical prism elements forming each prism area are directed parallel with the vertical line y—y of the front lens 13. However, the prism areas E′ and EO′ correspond to the prism areas E and EO of the conventional headlamp unit, but they are different from each other in directions of the prism areas and bottom lines of the cylindrical prism elements forming each prism area.

Figure 6:
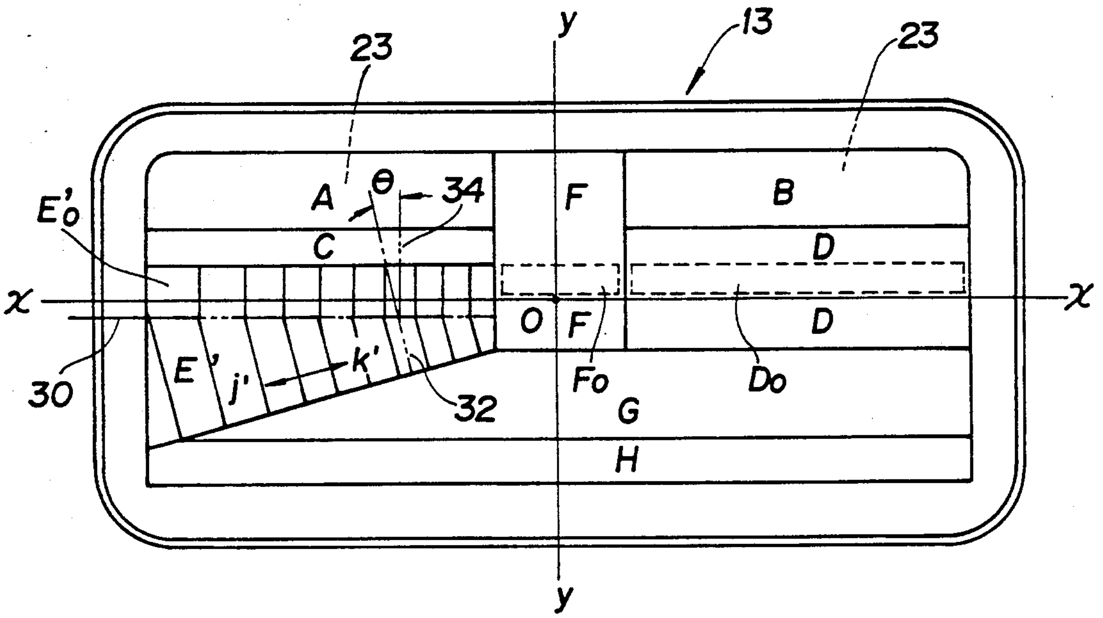
Figure 7:
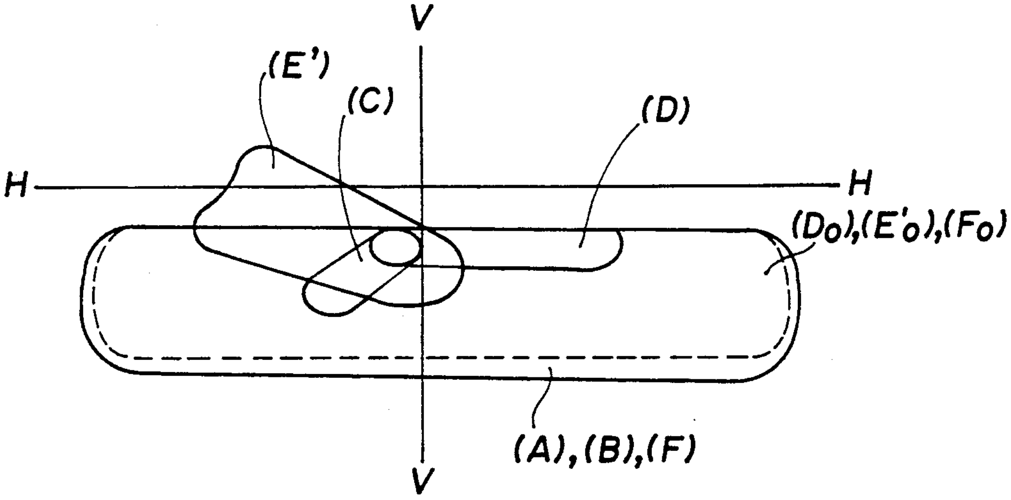

This difference will be further described below:

The prism area E0 of the conventional headlamp unit is located above the horizontal line x—x of the prism area E, while the bottom lines of the cylindrical prism elements forming the prism areas E and E0 are both directed as slanted an angle $\theta$ with respect to the axis y—y. According to this embodiment, the bottom line 32 of the prism area E′ is slanted an angle with respect to the axis y—y while the bottom line 34 of the prism area E0′ is parallel to the axis y—y, as shown in FIG. 6. The boundary line 30 between the prism areas E′ and E0′ is positioned below the horizontal line x—x. Therefore, the rays of light diverged at the light-diverging reflecting areas **22*a* and 22*b* and incident upon the prism area E0′ are directed in the x—x direction (horizontally). This direction is nearly the same as the direction of the rays of light diverged at the light-diverging reflecting areas 22*a* and 22*b* and incident upon the horizontal areas D0 and F0 inside the prism areas D and F. Hence, the illumination pattern (E′0) formed by the rays of light diverged at the light-diverging reflecting areas 22*a* and 22*b* and incident upon the prism area E0′ and by those reflected at the main reflecting area 20*b* is a horizontally elongated one positioned below the horizontal plane, similar to the illumination patterns (D0) and (F0) formed by the rays of light diverged at the light-diverging reflecting areas 22*a* and 22*b* and incident upon the horizontal areas D0 and F0, as shown in FIG. 7. Also, the the rays of light reflected at the main reflecting area 20*b* and incident upon the prism area E′ are diverged in the direction of arrows j′-k′. Therefore, an illumination pattern (E′) is formed as shown in FIG. 7**, which extends from the center to the upper left and in which the luminance is relatively high.

As shown in FIG. 7, the illumination pattern formed by the other prism areas A, B, C, D, F, G and H of the front lens 13 made according to the present invention is generally the same as that formed by the conventional prism areas A, B, C, D, F, G and H. It will be thus understood that the luminous intensity pattern derived from summation of the illumination patterns formed by all the prism patterns and actually projected on the surface of a lane does not partially extend to the opposite lane as with the conventional technique, with the horizontal cut line being well defined.

Figure 8:
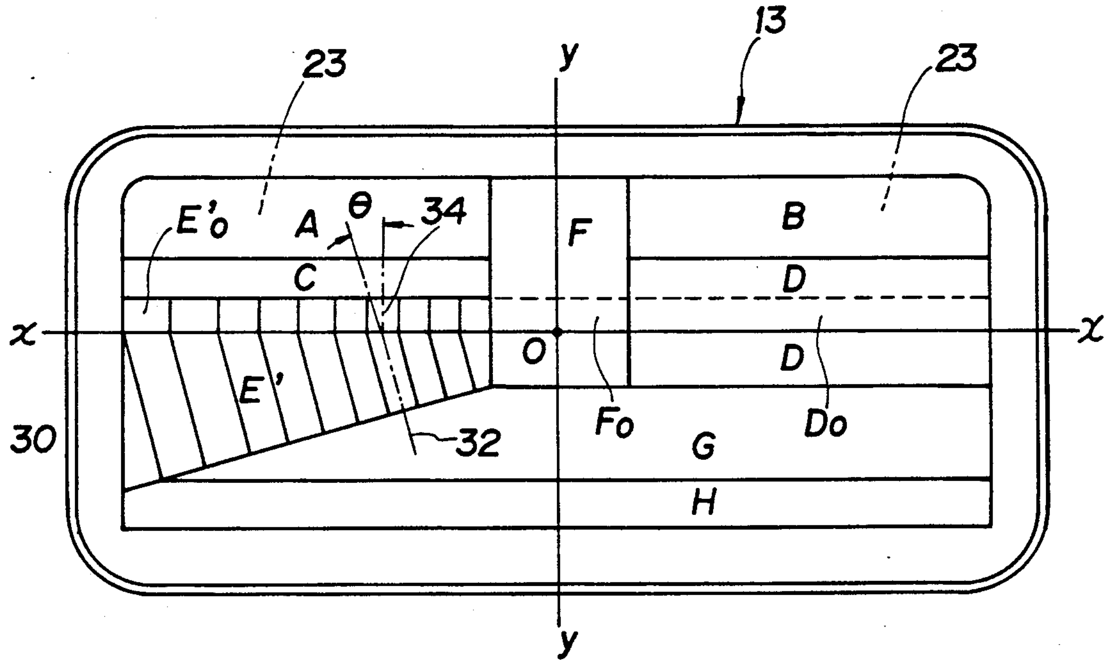
FIG. 8 is a front view, enlarged in scale, of the front lens, showing an appropriate disposition of the prism elements for a slant type headlamp unit of a type in which the reflector is fixed to the lamp housing.

According to this embodiment, the boundary line 30 between the prism areas E′ and E′0 is set below the horizontal line x—x. However, in case of a headlamp unit of a type in which the reflector 10 is formed integrally with the lamp housing 14 and the front lens 13 is secured to the circumferential edge of the front opening 16 of the lamp housing 14 with the center O thereof being previously made coincident with the optical axis of the reflector 10, it is not necessary to adjust the optical axis of the reflector 10, so the above-mentioned boundary line 30 may be made to coincide with the horizontal line x—x as shown in FIG. 8.

Figure 9:
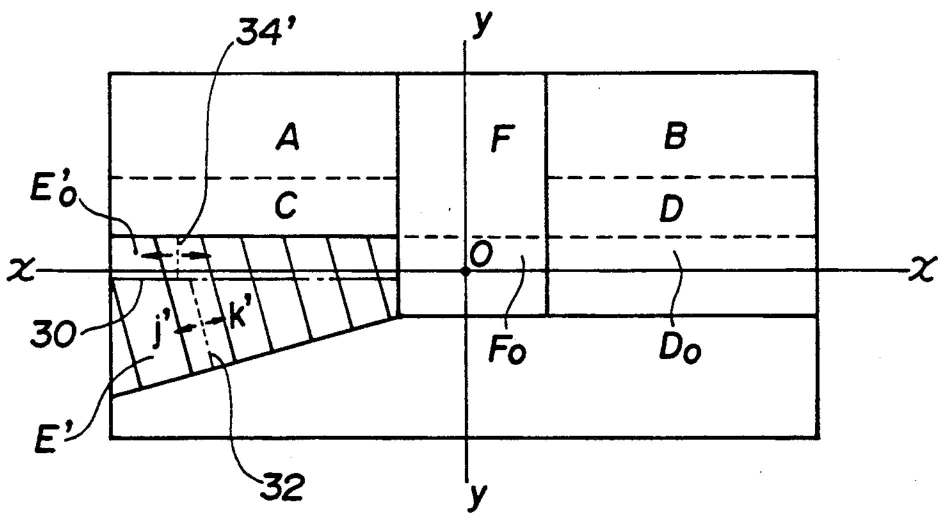
FIG. 9 is a schematic front view showing a variant of the front lens.
Figure 10:
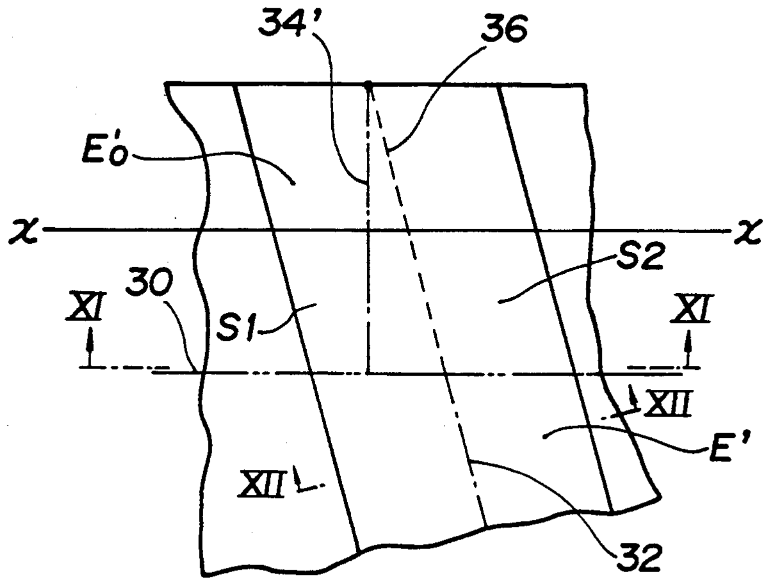
FIG. 10 is a detail diagram, partially enlarged in scale, of the structure of the prism elements forming the prism area E shown in FIG. 9.

FIG. 9 is a schematic front view showing a variant of the front lens 13.

According to the above-mentioned embodiment, the cylindrical prism elements forming the prism area E′0 located above the boundary line 30 and those forming the prism area E′ located below the boundary line 30 are not continuous at the boundary line 30 in line but with an angle to each other. However, the profile shape of the prism elements is not limited to such bent one. Namely, to attain the object of the present invention, the profile shape of the prism elements may be variable, and it suffices to form the cylindrical prism elements so that the rays of light incident upon the prism area E0′ above the boundary line 30 are diverged horizontally to the right and left. As shown in FIGS. 9 to 12, the cylindrical prism elements forming the prism area E′0 above the boundary line 30 and those forming the prism area E′ below the boundary line 30 are disposed apparently in line to each other and so that the rays of light incident upon the prism area E′0 above the boundary line 30 are diverged horizontally to the right and left (in the direction of arrows x—x). This structure will be described in detail below.

Figure 11:
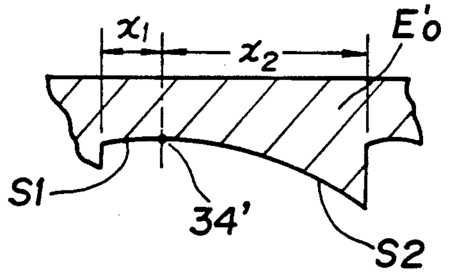
FIG. 11 is a sectional view taken along the line XI—XI in FIG. 10.
Figure 12:
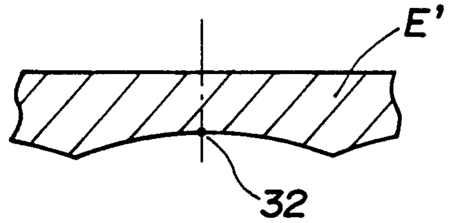
FIG. 12 is a sectional view taken along the line XII—XII in FIG. 10.
Figure 13:
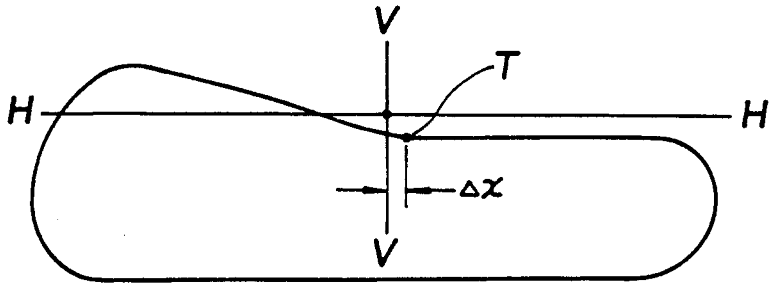
FIG. 13 is a schematic drawing of luminous intensity distribution pattern for the explanation of the effect of the variant of the present invention.

The bottom lines 32 of the cylindrical prism elements forming the prism area E′ below the boundary line 30 are slanted with respect to the line y—y, while the bottom lines 34′ of the cylindrical prism elements forming the prism area E0′ above the boundary line 30 are parallel to the line y—y but positioned outwardly off the bottom line 32. The extension line 36 (indicated with dash line) of the bottom line 32 passes by the end of the bottom line 34′. FIGS. 11 and 12 show the sections, respectively, of one of the cylindrical prism elements forming the prism area E0′ on the boundary line and one of the cylindrical prism elements forming the prism area E′ in the proximity of the boundary line, respectively. The cylindrical prism elements forming the prism area E′ are generally symmetrical with respect to the bottom line 32, while the cylindrical prism elements forming the prism area E0′ are formed asymmetrically with respect to the bottom line 34′. As seen from Figures, the area of the incidence surface S1 separated from an incidence surface S2 by the bottom line 34′ of each cylindrical prism element forming the prism area E0′ and which is distant from the line y—y is made smaller than that of the incidence surface S2 near the line y—y. Namely, the distances x1 and x2 on the boundary line 30 from the bottom line 34′ to the cylindrical prism elements, respectively, adjoining the incidence surfaces S1 and S2, respectively, are in a relation of $x1<x2$. The distance x1 should be set as short as possible as compared with the distance x2. Among the rays of light reflected at the main reflecting area 20*b* and incident upon the incidence surfaces S1 and S2, those incident upon the incidence surface S2 are diverged nearly in the direction of the line x—x as refracted with a larger angle than the rays of light incident upon the incidence surface S1, so the former rays of light will form an illumination pattern extending greatly to the left from the line V—V in the pattern shown in FIG. 7, while the latter rays of light will form an illumination pattern extending slightly beyond the line V—V. Also, the rays of light reflected at the main reflecting area 20*b* and incident upon the prism area E′ are diverged in the direction of arrows j′-k′ to form an illumination pattern extending from the center to the upper left and of which the luminance is relatively high, which is the same as in the above-mentioned embodiment. The point indicated with a sign T in the luminous intensity distribution pattern as shown in FIG. 13 is a so-called elbow point, and it is recognized as an intersection between an illumination pattern extending from the center to the upper left and of which the luminance is relatively high and a horizontally elongated illumination pattern of which the luminance is relatively high. The shorter the distance x1, the shorter the distance Δx between this elbow point and the center of the pattern becomes. Namely, since the rays of light extending slightly in the direction of line V—V beyond the slanted cut line become very small, the displacement Δx of the elbow point can be made very small.

What is claimed is:

1. A slant type headlamp unit for motor vehicles, comprising a reflector having an optical axis and as its inner reflecting surface a reflecting area taking the form of a part of a paraboloid of revolution, a lamp bulb having at least a coil filament disposed in the proximity of the focus of said paraboloid of revolution and nearly parallel with the optical axis of said reflector, a front lens slantably disposed with respect to said optical axis, and defining a front lens plane which includes a horizontal, X axis and a Y axis perpendicular thereto, said X and Y axes lying in said front lens plane and intersecting with the optical axis, said front lens covering the front opening of said reflector and having a plurality of prism areas which refract the rays of light emitted from said lamp bulb and reflected at said reflector;

said reflector having light-diverging reflecting areas formed in positions above said optical axis and nearly symmetrical with respect to a vertical plane in which said optical axis lies, said light-diverging reflecting areas being composed of a plurality of light-diverging reflecting elements which diverge in the horizontal plane the rays of light emitted from said lamp bulb;

said prism areas of the front lens comprising first and second prism areas, said first prism areas forming horizontally elongated illumination patterns in a frontward direction with at least one portion of said first prism areas being located along the X axis, said at least one portion of the first prism areas having substantially the same horizontally diverging property as said light-diverging reflecting areas of the reflector, said second prism areas forming slanted illumination patterns with respect to said horizontally elongated illumination patterns in a frontward direction and being located in the Y direction below said at least one portion of the first prism areas such that said slanted illumination patterns and said horizontally elongated illumination patterns are superposed to produce a luminous intensity distribution pattern having a cut-off line defined by an upper contour of said luminous intensity distribution pattern which does not extend to a traffic lane running in the opposite direction of said motor vehicles.

2. A slant type headlamp unit for a motor vehicle, comprising a reflector having an optical axis and as its inner reflecting surface a reflecting area taking the form of a part of a paraboloid of revolution, a lamp bulb having at least a coil filament disposed nearly parallel with the optical axis of said reflector and which has the center thereof disposed in a position slightly spaced frontwardly from the focus of said paraboloid of revolution, a front lens slantably disposed with respect to said optical axis, said front lens covering the front opening of said reflector and defining a front lens plane which includes a horizontal, X axis and a Y axis perpendicular thereto, said X and Y axes lying in said front lens plane and intersecting with the optical axis, said front lens having provided on its inner surface a plurality of prism areas which refract the rays of light emitted from said lamp bulb and reflected at said reflector, thereby forming horizontally elongated illumination patterns and slanted illumination patterns frontwardly with respect to said horizontally elongated illumination patterns, each of said prism areas being composed of a plurality of concave cylindrical prism elements having a bottom line extending along the deepest portion of said concave cylindrical prism elements, and each of said prism elements having a predetermined curvature required for forming respective illumination patterns;

said reflector having light-diverging reflecting areas formed in positions above said optical axis and nearly symmetrical with respect to a vertical plane in which said optical axis lies, said light-diverging reflecting areas being composed of a plurality of light-diverging reflecting elements which diverge in the horizontal plane the rays of light emitted from said lamp bulb;

said prism areas of the front lens comprising first and second prism areas, said first prism areas forming horizontally elongated illumination patterns in a frontward direction, said second prism areas forming slanted illumination patterns in a frontward direction and being located adjacent said first prism area;

said first prism areas further comprising a finite prism area in which said bottom lines of said cylindrical prism elements are disposed parallel to the Y axis of said front lens plane, said finite prism area being positioned in the Y direction above said second prism areas, said second prism areas having bottom lines of its cylindrical prism elements disposed at an angle with respect to the Y axis thereby forming said slanted illumination patterns whereby said illumination patterns are superposed to produce a luminous intensity distribution pattern having a cut-off line which does not extend to a traffic lane running in the opposite direction of said motor vehicle.

3. A slant type headlamp unit for motor vehicles according to claim 2, wherein the bottom lines of the plurality of cylindrical surfaces forming the prism areas which form said slanted illumination pattern in a frontward direction are slanted with respect to the horizontal line passing by the intersection with said optical axis and the plurality of cylindrical surfaces forming said finite prism areas are contiguous to said plurality of slanted cylindrical surfaces, respectively, with their bottom lines being nearly perpendicular to the horizontal line passing by the intersection with said optical axis.

4. A slant type headlamp unit for motor vehicles according to claim 3, wherein a boundary line between the prism area which forms said slanted illumination pattern in a frontward direction and said finite prism area is disposed in contact with the horizontal line passing by the intersection with said optical axis.

5. A slant type headlamp unit for motor vehicles according to claim 2, wherein the plurality of cylindrical prism elements composing said second prism areas which form said slanted illumination pattern are formed symmetrically with respect to their bottom lines and the plurality of cylindrical prism elements composing said finite prism area are formed asymmetrically with respect to their bottom lines.

6. A slant type headlamp unit for a motor vehicle as recited in claim 2, wherein the bottom lines of said plurality of cylindrical surfaces forming the second prism areas which form said slanted illumination patterns are disposed at an angle with respect to the X axis and are contiguous with the bottom lines of the cylindrical surfaces forming said finite prism area.

7. A slant type headlamp unit for a motor vehicle as recited in claim 6, wherein the second prism areas and the finite prism area are contiguous to one another along a boundary line, and wherein said boundary line is disposed overlaying said X axis.

8. A slant type headlamp unit for a motor vehicle as recited in claim 6, wherein the second prism areas and the finite prism area are contiguous to one another along a boundary line, and wherein said boundary line is disposed in the Y direction below said X axis.

9. A slant type headlamp unit for a motor vehicle as recited in claim 2, wherein the bottom lines of said plurality of cylindrical surfaces forming the second prism areas which form said slanted illumination patterns are disposed at an angle with respect to the X axis.

10. A slant type headlamp unit for a motor vehicle as recited in claim 9, wherein the second prism areas and the finite prism area are contiguous to one another along a boundary line, and wherein said boundary line is disposed overlaying said X axis.

11. A slant type headlamp unit for a motor vehicle as recited in claim 10, wherein the second prism areas and the finite prism area are contiguous to one another along a boundary line, and wherein said boundary line is disposed in the Y direction below said X axis.

* * * * *